United States Patent
Graabæk

(10) Patent No.: US 11,082,772 B2
(45) Date of Patent: Aug. 3, 2021

(54) MULTIMEDIA INSTALLATION

(71) Applicant: Bang & Olufsen A/S, Struer (DK)

(72) Inventor: Jakob Bergstrøm Graabæk, Holstebro (DK)

(73) Assignee: Bang & Olufsen A/S, Struer (DK)

( * ) Notice: Subject to any disclaimer, the term of this patent is extended or adjusted under 35 U.S.C. 154(b) by 0 days.

(21) Appl. No.: 16/823,428

(22) Filed: Mar. 19, 2020

(65) Prior Publication Data

US 2020/0305598 A1    Oct. 1, 2020

(30) Foreign Application Priority Data

Mar. 26, 2019   (EP) .................................... 19165087

(51) Int. Cl.
*H04R 1/02*   (2006.01)
*H04R 5/02*   (2006.01)

(52) U.S. Cl.
CPC ............... *H04R 5/02* (2013.01); *H04R 1/023* (2013.01); *Y10S 248/919* (2013.01)

(58) Field of Classification Search
CPC . H04R 1/00; H04R 1/02; H04R 1/023; H04R 1/025; H04R 1/026; H04R 1/028; H04R 5/02; G06F 1/16; G06F 1/1615; G06F 1/1616; G06F 1/1624; Y10S 248/917; Y10S 248/918; Y10S 248/919; Y10S 248/92; Y10S 248/924
See application file for complete search history.

(56) References Cited

U.S. PATENT DOCUMENTS

| | | | |
|---|---|---|---|
| 6,760,456 B1 * | 7/2004 | Annaratone | G06F 1/1616 361/679.55 |
| 2002/0186528 A1 * | 12/2002 | Huang | G06F 1/1688 361/679.23 |
| 2004/0209641 A1 * | 10/2004 | Hong | H04M 1/0247 455/550.1 |
| 2005/0146251 A1 * | 7/2005 | Gillengerten | A47B 81/06 312/8.16 |
| 2006/0078143 A1 * | 4/2006 | Yang | H04R 5/02 381/333 |
| 2009/0140615 A1 * | 6/2009 | Freeman | H05K 5/0017 312/7.2 |
| 2012/0008795 A1 | 1/2012 | Springer | |
| 2013/0177181 A1 * | 7/2013 | Marcus | H04R 1/02 381/189 |
| 2015/0215692 A1 | 7/2015 | Yu | |

FOREIGN PATENT DOCUMENTS

| | | | |
|---|---|---|---|
| CN | 207369264 U | * | 5/2018 |
| JP | 2009302667 A | * | 12/2009 |
| KR | 20070002813 A | | 1/2007 |

* cited by examiner

*Primary Examiner* — Thang V Tran
(74) *Attorney, Agent, or Firm* — James Creighton Wray

(57) ABSTRACT

Multimedia installation comprising a base to which base a video screen is mounted and where two movable loudspeaker assemblies are rotatably mounted to said base where the base has a stationary part and a movable part, such that by activating the multimedia installation the screen is elevated by the movable part, and the movable loudspeaker assemblies comprise means for rotating the movable loudspeaker assemblies from a first position where the loudspeaker assemblies cover at least a part of the screen as seen from a user's position, into a second position where at least a substantial and larger part of the screen is visible and if/when desirable back to the first position.

9 Claims, 6 Drawing Sheets

MULTIMEDIA INSTALLATION

This application claims the benefit of European Application No. 19165087.8 filed Mar. 26, 2910, which is hereby incorporated by reference in its entirety as if fully set forth herein.

FIELD OF THE INVENTION

The present invention relates to a multimedia installation.

BACKGROUND OF THE INVENTION

Multimedia installations typically comprise a screen, loudspeakers, a control unit for providing input to the screen and to the loudspeakers, the input being in the shape of a signal from a television provider, radio provider, various internet platforms and the like. It is clear that other components may also be comprised in a multimedia installation.

Common for all these systems is that the decrease in prices for large screens combined with an increased screen quality and resolution encourage the user to obtain ever increasing screen sizes. The high quality of both sound and picture content also requires a decent audio and video installation in order to reproduce the pictures on the screen and sound in the loudspeakers to their utmost performance. At the same time the increasing sizes of both loudspeakers and screens require more and more space and wall surface area in homes and other places and as such these multimedia installations become more and more dominating in an interior decoration scheme.

Various attempts to provide permanent pictures or almost permanent pictures on the screens have been made in order to "hide" the large screens and camouflage them as pictures or art when not used to watch video content. It is also known to provide roller doors or blinds made in a pleasing material to "hide" the typically black switched off screen. These measures all try to allow the multimedia installation to blend better into the environment, but do not change the fact that the multimedia installation still occupies a substantial space in the interior decoration scheme.

OBJECT OF THE INVENTION

Consequently, it is an object of the present invention among other advantages to provide a multimedia installation which when not in use is less dominating and requires less space than when the multimedia installation is in use and at the same time also allows for information to be displayed on the screen and other surprising effects.

DESCRIPTION OF THE INVENTION

The invention addresses this by providing a multimedia installation comprising a base to which base a video screen is mounted and where two movable loudspeaker assemblies are rotatably mounted to said base where the base has a stationary part and a movable part, such that by activating the multimedia installation the screen is elevated by the movable part, and the movable loudspeaker assemblies comprise means for rotating the movable loudspeaker assemblies from a first position where the loudspeaker assemblies cover at least a part of the screen as seen from a user's position, into a second position where at least a substantial and larger part of the screen is visible and if/when desirable back to the first position.

The fact that the loudspeaker assemblies may be moved from a first position where the loudspeaker assemblies cover at least part of the screen into a second position where the screen is nearly or fully visible, i.e. the loudspeaker assemblies and the screen fold out the entire multimedia installation when activated, first of all creates a surprising visual effect for a user in the room and secondly only occupies a minimum of (wall) space, for example corresponding to the outer limitations of the screen, in that the loudspeaker assemblies are folded/rotated in front of the screen.

By furthermore providing the loudspeakers with an aesthetically pleasing outer surface, the impact of a relatively large multimedia installation on an interior decoration scheme may be minimized or altogether be used to enhance the interior decoration scheme.

As the screen is elevated there is made room underneath for the loudspeakers which when turned from the first position into the second position are able to provide a relatively wide sound bar not interfering with the screen.

In a further advantageous embodiment of the invention the base comprises at least one electrically operated actuator suitable to elevate and lower the movable part relative to the stationary part of the base, and thereby the screen. The electrically operated actuator provided for the movement may be wirelessly controlled or operated by a switch on the multimedia installation such that activating or turning on the multimedia installation initially sets the movement of the screen and the loudspeakers in motion in order for the multimedia installation to fold out and achieve its use configuration i.e. elevated screen and rotated loudspeaker assemblies.

As should be evident of the inventive concept of the invention as described above, the physical sizes, for example of the screen, are completely independent of the physical sizes of the loudspeaker assemblies, and as such as long as the base is strong enough and stable enough any size screen may be used in the multimedia installation in that the screen is simply elevated or arranged behind the loudspeaker assemblies and as such the sides of the screen are completely independent from the remainder of the system and the base shall only be able to elevate the screen to a suitable height (free of the loudspeakers).

In practice, for aesthetic reasons the screen will be elevated to such a height which provides the optimum viewing angle for a user, i.e. substantially at eye height or slightly above, such that the viewer will be able to be positioned in a chair or the like and comfortably be able to view the screen.

In order to provide an aesthetically pleasing unit the width of the loudspeakers in the first position which will be the height of the loudspeakers in the second position will be dimensioned such that no major gaps arise between a floor surface and lower side of the screen and hence the multimedia installation will in the second position where the loudspeaker assemblies are rotated from the first position present itself as a substantially homogenous structure. As will be explained below with reference to detailed embodiments a number of variations between screen sizes and loudspeaker assembly sizes are contemplated within the scope of the present invention.

As is clear the relative sizes do not influence the inventive concept of being able to rotate the loudspeaker assemblies at the same time as the screen is elevated in order to expose the entire screen and provide the loudspeakers in an integrated unit.

In a still further advantageous embodiment of the invention the base is provided with two ground towers attached to the stationary part, where each ground tower in a distal end is provided with a pivotal connection to a first end of a lever arm, where said lever arm in the opposite end is pivotally connected to one loudspeaker assembly, and where the same loudspeaker assembly is pivotally connected to a loudspeaker assembly connection point provided on the movable part of the base, such that as the base is activated to elevate or lower the screen, and the movable part moves relative to the stationary part, the loudspeaker assemblies will be rotated at the same time.

Each ground tower is in a distal end, i.e. the end not connected to the stationary part of the base, provided with a pivotable connection. This connection allows a lever arm connected at the other end to the loudspeaker assembly to pivot around the connection point.

When the movable part of the base is elevated relative to the stationary part the loudspeaker assembly will due to the connection point provided between the loudspeaker assembly and the movable part pull the loudspeaker assembly upwards together with the movable part. The lever arm will cause the loudspeaker assembly to rotate (as the connection point between the lever arm and the loudspeaker and the connection point between the loudspeaker and the movable part are offset) such that the loudspeaker assemblies will move from the first position to the second position during the elevation of the movable part.

With this movement it is foreseen that the elevation of the movable part of the base corresponds to a 90 degree turn of the loudspeaker assemblies. When the movable part is lowered relative to the stationary part of the base the reverse movement will take place, i.e. the loudspeaker assemblies will be rotated back from the second position into the first position due to the interaction between the lever arm and the connection point between the loudspeaker and the movable section.

In a further advantageous embodiment the connection points provided on the movable part of the base are longitudinal apertures arranged with their longitudinal extent perpendicular to the direction of movement of the movable part, such that the pivotal connection between the lever arm and the movable part may move inside said longitudinal aperture.

By providing the longitudinal apertures the loudspeaker assemblies are allowed also to move laterally with respect to the direction in which the movable part is being elevated such that it can be ensured that for example corners of the loudspeaker assemblies do not interfere with each other and thereby damage each other during movement, such that sufficient space is provided for the lateral movement of the loudspeakers allowing them to move from the first position to the second position, and at the same time providing the possibility of very narrow gaps between the loudspeakers in rest positions (first and second positions).

In a still further advantageous embodiment of the invention a side control arm is provided for each movable loudspeaker assembly, said side control arm is in one end connected adjacent the connection points in the movable part, and in the other end pivotably fastened to the loudspeaker assembly, such that as the loudspeaker assembly rotates, the side control arm will ensure that a constant distance remains between adjacent and closest sides of the loudspeaker assemblies.

The side control arm ensures that a minimum distance is maintained between the two rotating loudspeaker assemblies during the movement from the first position to the second position. Furthermore, the longitudinal apertures provide for the possibility of a slight displacement of the loudspeaker assemblies relative to each other during the movement from the first to the second position and vice-versa, such that a substantially very precise distance is maintained between the two loudspeaker assemblies, both in the first position and particularly in the second position.

In an advantageous embodiment of the invention the up and down movement of the movable part is controlled by a control unit, where said rotatable loudspeaker assemblies are connected to respective electrical motors via axles, belts, rack and pinion or chains, where the control unit controls the turning of the axles such that the loudspeaker assemblies are rotated from the first position to the second position substantially during the time lapsed for the screen to reach its desired elevation, and vice versa.

Above the movement of the loudspeaker assemblies was described as created by mechanical means, i.e. lever arms and the movement of the movable part of the base, whereas it is also contemplated within the scope of the invention that the movement of the loudspeaker assemblies may be coordinated with the movement of the elevation part of the base such that for example by connecting the loudspeaker assemblies to respective electrical motors, in particular step motors, by well-known mechanical means it is possible to create the movement, i.e. rotate the loudspeaker assemblies from the first position to the second position by electrical motor means.

In a further advantageous embodiment of the invention it is foreseen that the loudspeaker assemblies in the first position substantially cover the screen as seen from a direction perpendicular to the display surface of the screen. In this configuration with loudspeaker assemblies having a shape and size corresponding to the screen, the screen will be substantially hidden in the position where the loudspeaker assemblies are in the first position, i.e. the screen has not been elevated. It is also possible that the loudspeaker assemblies have a substantially smaller size such that the screen will be partly visible at all times and that the viewable part of the screen may display information, data etc., for example information about the music being played in the loudspeaker assemblies, e-mails, reminders from calendars etc.

As the multimedia installation is activated, i.e. the screen will be elevated from the first position to the second position, the screen will revert to its original purpose, namely to display for example a movie or a full-screen picture or the like.

In a further advantageous embodiment of the invention the loudspeaker assemblies each comprise a housing and a front cover, where each housing and front cover have a lower side and an upper side, and an inner and outer side connecting distal ends of the upper and lower sides, such that in the first position the inner sides are proximate and substantially parallel to each other, the sides together defining the periphery of each substantial four sided housing and front cover, wherein the front cover may be substantially larger than the housing, and where the front covers of both loudspeaker assemblies in the first position are arranged such that the inner sides are parallel and flush with a corresponding side of the housing, and the lower sides are at the same level and flush with lower sides of respective housings.

With this embodiment it is possible to provide relatively small loudspeaker housings, but at the same time provide front covers which may be very different from the housings, for example they may have a size such that they may cover a very large screen, 80 inches or more, whereas very large loudspeaker housings are not necessary in order to provide a sufficient sound pressure in a normal living room having a size such that they may cover an 80 inch+ screen.

It is, however, important that the front cover is mounted on the housing such that the lower sides of the housing in the first position are flush with the lower sides of the front covers and that the inner sides of the housing, i.e. the facing sides of the housings in the first position, are parallel and flush with the inner sides of the front covers in that as the rotational movement of the loudspeaker assemblies during the rotation from the first position to the second position will cause the corners of respective housings to be in close proximity, there will not be sufficient space between the two rotating loudspeaker assemblies in all positions during the rotation. If sufficient space was to be provided, the gap between the two loudspeaker assemblies would be too large in the first and second positions, providing an undesired design effect.

DESCRIPTION OF THE DRAWING

The invention will now be explained with reference to the accompanying drawings wherein.

DETAILED DESCRIPTION OF THE INVENTION

In the figures the same reference numbers will designate the same features.

Figure 1:
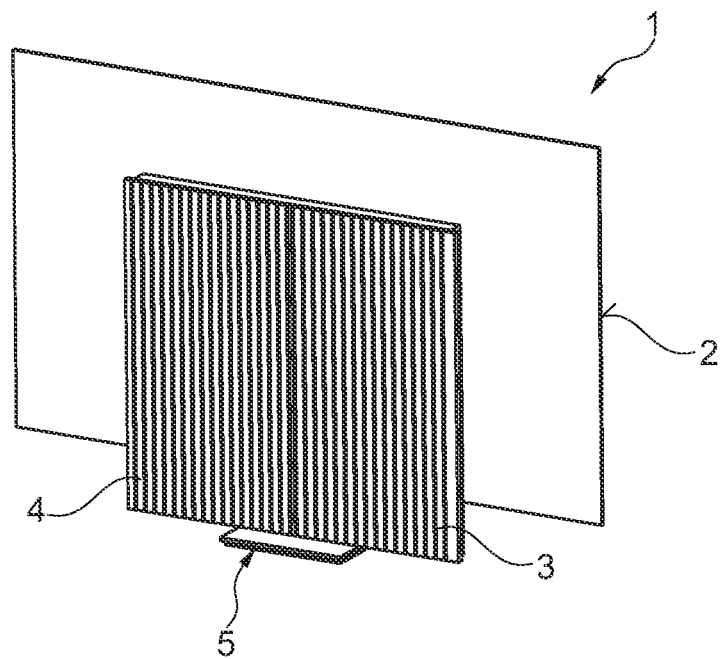
FIG. 1 illustrates a multimedia installation with screen and loudspeaker assemblies in their first positions.

In FIG. 1 is illustrated a multimedia installation 1 comprising a screen 2 and two loudspeaker assemblies 3, 4. The multimedia installation 1 also comprises a stand 5 which will be discussed in further detail below. In FIG. 1 the loudspeaker assemblies 3, 4 are in a first position where the loudspeaker assemblies' front covers cover a substantial part of the screen as seen from a user's viewpoint.

Figure 2:
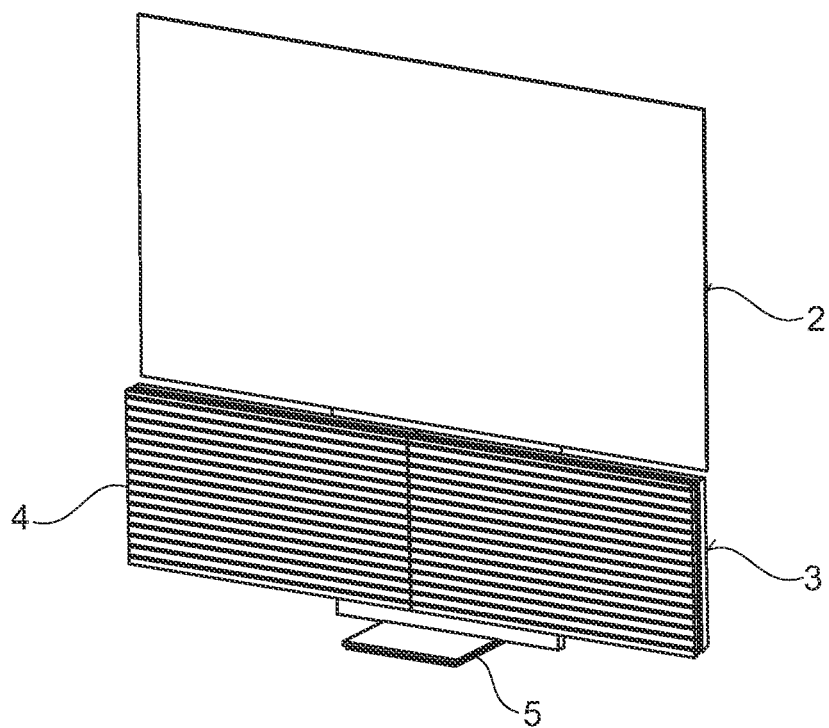
FIG. 2 illustrates loudspeaker assemblies which have been rotated into their second position and the screen which has been lifted in its second position.

Turning to FIG. 2 the loudspeaker assemblies 3, 4 have been rotated into their second position where they do not cover the screen 2. The loudspeaker assemblies 3, 4 have been rotated 90 degrees in opposite directions.

In the embodiments illustrated the side edges of the screen in the second position are flush with the edges of the loudspeaker assemblies. This is, however, not a given or requirement. The loudspeaker assemblies may have a size such that they for example cover the screen in the first position, or any other desirable size, as may the screen. Consequently both in the first and second positions the screen may be of the same size or be larger or smaller than the loudspeaker assemblies, as seen from a user's point of view.

Figure 3:
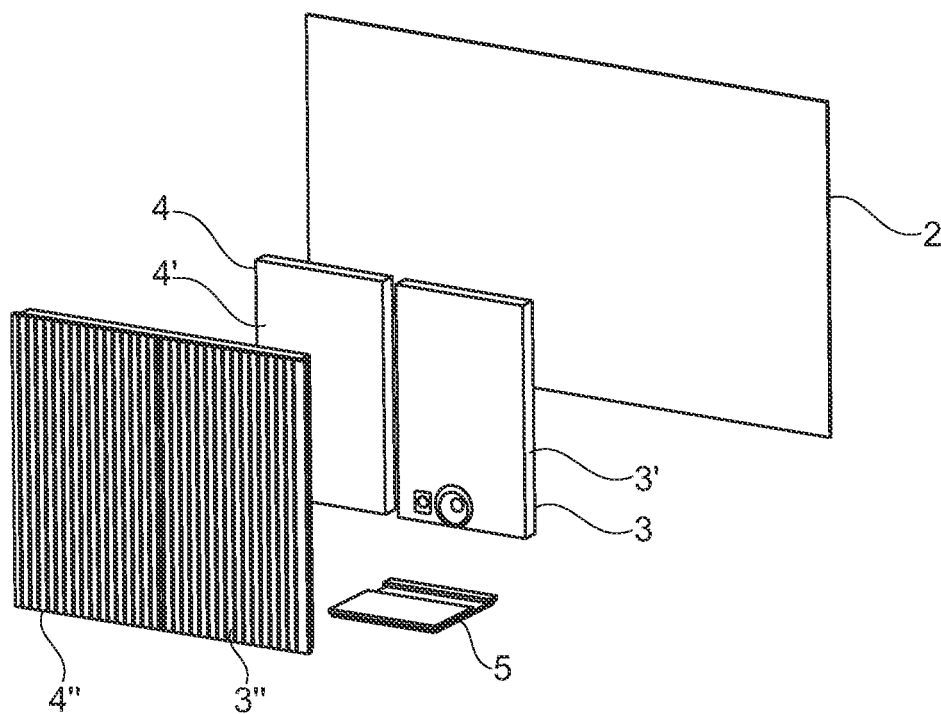
FIG. 3 illustrates an exploded view of the various components

In FIG. 3 an exploded view of the various components is illustrated. For illustrative purposes only some of the components of the system are illustrated, such as loudspeaker assemblies 3, 4, loudspeaker covers 3', 4' and loudspeaker housings 3", 4", screen, 2 and stand 5. The loudspeaker assemblies 3, 4 each comprise a loudspeaker housing 3', 4' and a front cover 3", 4". As illustrated in FIG. 3 the front covers 3", 4" do not have to have the same size as the housings. Usually the front covers 3", 4" will have a size corresponding to or larger than a front surface of the loudspeaker housing 3', 4'. See further below with respect to FIG. 8a-8c. The height of the front covers 3", 4" in their first position may be chosen such that the combined width of the front covers 3", 4" in their second position matches the width of the screen 2.

Figures 4A, 4B, 4C:
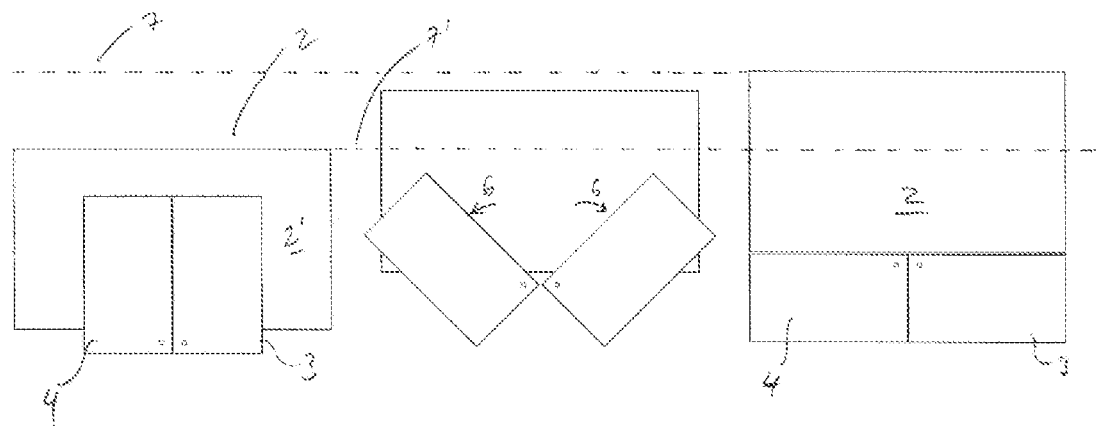
FIG. 4a-4c illustrate the rotational movement of the loudspeaker assemblies in three positions

In FIG. 4a-4c the rotational movement of the loudspeaker assemblies 3, 4 is illustrated in three positions relative to the elevation of the screen 2. In FIG. 4a the first position is illustrated corresponding to FIG. 1. Here the loudspeaker assemblies 3, 4 are in a position where they partly cover the screen 2.

The area of the screen 2' not covered by the loudspeaker assemblies 3, 4 may be used as display for displaying various information (time, date, emails, messages, pictures etc.).

As the multimedia installation 1 is activated the screen 2 is elevated. At the same time the loudspeaker assemblies 3, 4 will begin to rotate (illustrated by the arrows 6), see FIG. 4b.

Further elevation of the screen 2 will cause the loudspeaker assemblies 3, 4 to rotate further and arrive in the second position, illustrated in FIG. 4c. The horizontal dashed lines 7, 7' indicate the levels of the upper edge of the screen of the multimedia installation 1 in the first respective second positions.

The movement as described and illustrated above with reference to FIG. 4a-4c may be achieved in a multitude of manners. For example the screen 2 may by connected to one or more electric actuators, which may elevate the screen 2 from the lower position (level 7') to the higher position (level 7) and at the same time one or more further electrical motors may be operated to turn/rotate the loudspeaker assemblies 3, 4 from the first position to the second position in a movement controlled and coordinated by a control box.

It is also contemplated to only have one motor driving both the elevation of the screen 2 and the rotation of the loudspeaker assemblies 3, 4.

A particular advantageous embodiment will be described with reference to FIG. 5-7c.

In FIG. 5-7c the screen is not depicted.

Figure 5:
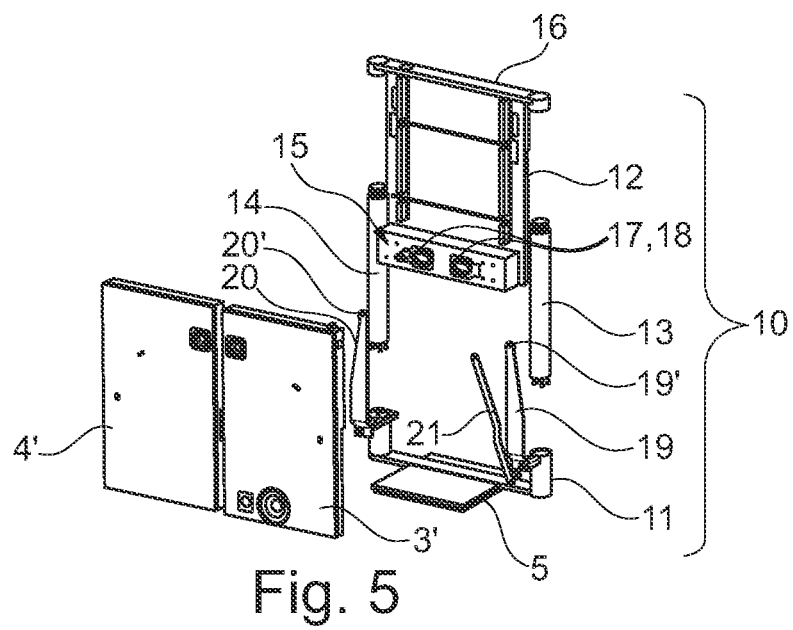
FIG. 5 illustrates an embodiment of the invention where the stand is connected to a base

In FIG. 5 is illustrated an embodiment of the invention where the stand 5 is connected to a base 10. The base 10 comprises a stationary part 11 as well as a movable part 12. In order to create the relative movement between the stationary part and the movable part linear actuators 13, 14 are provided. The movable part 12 comprises a bridge 15 as well as a platform 16.

The bridge 15 and the platform 16 are used in order to mount the screen. The bridge 15 also comprises elongated apertures 17, 18. These apertures 17, 18 are used for creating a connection point to the loudspeaker assemblies, here illustrated by the loudspeaker housings 3', 4' (the front covers 3", 4" of the loudspeaker assemblies 3, 4 are not shown).

The stationary part 11 is furthermore provided with two ground towers 19, 20. Each ground tower 19, 20 is in one end connected to the stationary part 11 and in a free distal end 19', 20' provided with a pivotable connection point. The pivotable connection point in the distal ends 19', 20' is connected to a lever arm 21, 21'. In FIG. 5 only one lever arm 21 is visible, but a symmetric arrangement is provided and hence a second lever arm 21' connected to the distal end 20' of the other ground tower 20 is also provided. This can be seen in FIG. 6*a*.

In the opposite end of the lever arm 21, 21' at the end of the lever arm 21, 21' connected to the distal end 19', 20' of the ground tower 19, 20 the lever arm 21, 21' is connected to the rear side of the loudspeaker housing 3', 4'. The interaction between the parts described with reference to FIG. 5 will now be described with reference to the movement of the loudspeaker assemblies 3, 4 relative to the base 10 with the parts described above. In this context reference is made to FIG. 6*a*-6*c*.

Figure 6A:
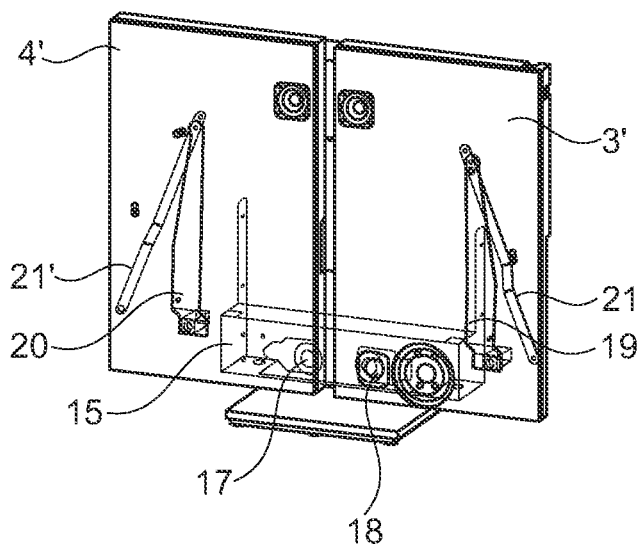
FIG. 6a illustrates the movable part of the base

FIG. 6*a* corresponds to the position which is also illustrated in FIG. 1, i.e. the loudspeaker assemblies 3, 4 are in the first position in front of the screen 2. The screen 2 is not illustrated in any of the FIG. 5-7*c*, but it is understood that a screen is or may be mounted on the bridge 15 and platform 16.

In FIG. 6*a* the movable part 12 of the base 10 is illustrated as being in its lowest position, i.e. in the first position where the loudspeaker assemblies 3, 4 are positioned in front of the screen 2. For the sake of clarity only the loudspeaker housings 3', 4' as well as only part of the base 10 necessary to explain the movement is illustrated in FIG. 6*a*-7*c*. The bridge 15 provided with the elongated apertures 17, 18 is connected to the rear side of the loudspeaker housings 3', 4'. In the same manner the lever arms 21, 21' are in the end not connected to the ground towers 19, 20 pivotally connected to the rear side of the loudspeaker housings 3', 4'.

As the actuators 13, 14 are activated the movable part 12 will move relative to the stationary part 11 mounted on the stand 5. As the lever arms 21, 21' are mounted on the stationary part 11 (to the distal ends 19', 20' of the ground towers 19, 20) there is an offset between the pivot points connected in the connection points with the elongated apertures 17, 18 and the attachment points for the lever arms 21, 21' to the loudspeaker housings 3', 4' such that, as the movable part 12 is elevated, the loudspeaker housings 3', 4' will begin to rotate as illustrated with reference to FIG. 6*b*.

As the bridge 15 and thereby the movable part 12 is elevated relative to the stationary part 11 mounted on the stand 5, the lever arms 21, 21' will pivot in the pivot points 19', 20'.

Figure 6B:
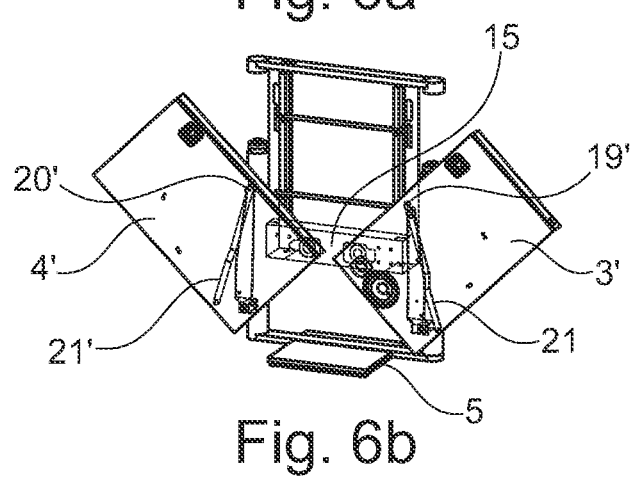
FIG. 6b illustrates how the loudspeaker housings will begin to rotate
Figure 6C:
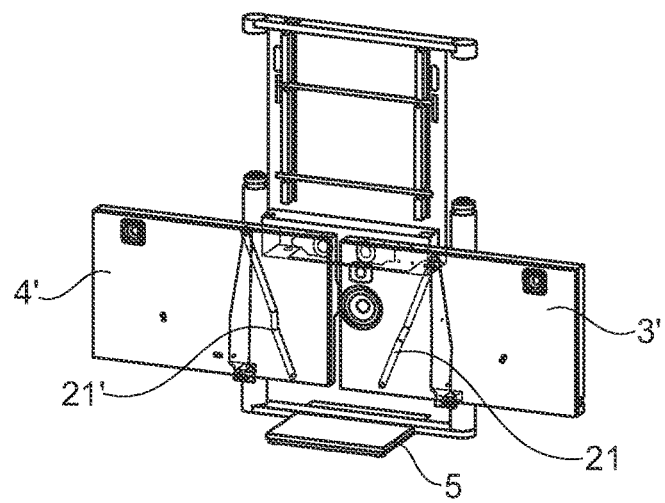
FIG. 6c illustrates the loudspeaker housings having reached the second position where a rotation of approx. 90° has been achieved

At the end of the movement as illustrated in FIG. 6*c* the loudspeaker housings 3', 4' have reached the second position where a rotation of approx. 90° has been achieved. In this position the lever arms 21, 21' have swung into a position such that the connection points through the loudspeaker housing 3', 4' are between the ground towers 19, 20 whereas in the first position the connection points as illustrated with reference to FIG. 6*a* are outside the ground towers.

It is clear that in the reverse movement, i.e. lowering the movable part 12 and thereby the bridge 15 towards the stationary part 11 mounted on stand 5, the lever arms 21, 21' will swing back out into the position as illustrated in FIG. 6*a* and at the same time the loudspeaker housings 3', 4' will be rotated in the opposite direction as illustrated in FIGS. 6*b* and 6*a*.

During the movement from the position of the loudspeaker housings 3', 4' illustrated with reference to FIG. 6*a* to the second position of the loudspeaker housings 3', 4' illustrated with reference to FIG. 6*c* the elongated apertures 17, 18 providing a connection point on the rear side of the loudspeaker housings 3', 4' will allow the loudspeaker housings 3', 4' to move laterally with respect to the direction of movement, allowing that the loudspeaker housings 3', 4' do not interfere with each other which could otherwise be the case if the gap between the loudspeaker housings 3', 4' is desired to be very small.

Particularly the corners of the loudspeaker housings 3', 4' as illustrated in FIG. 6*b* may come into very close proximity, but by providing the elongated apertures 17, 18 in the bridge 15 lateral movement is allowed thereby avoiding interference of the two loudspeaker housings 3', 4'.

Figure 7A:
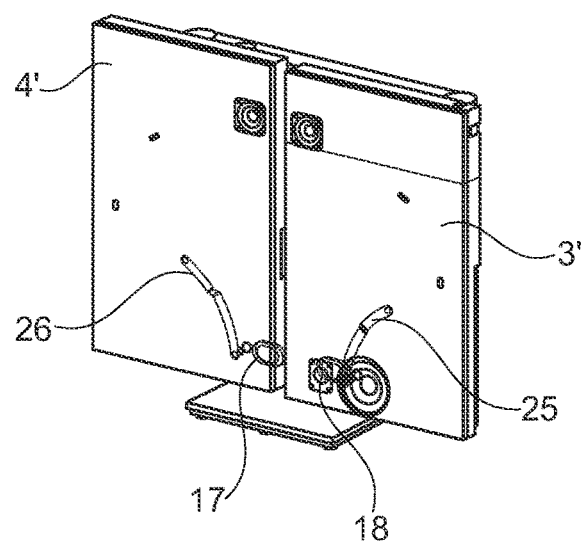
FIG. 7a illustrates loudspeaker housings in their first position and the side control arms keeping the loudspeaker housings close together
Figure 7B:
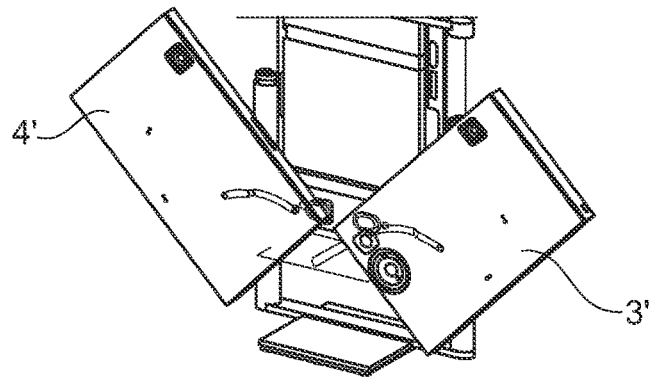
FIG. 7b illustrates the loudspeaker housings in an intermediate position with the side control arms having moved the loudspeaker housings away from each other to maintain the same distance between the loudspeaker housings and to avoid collision
Figure 7C:
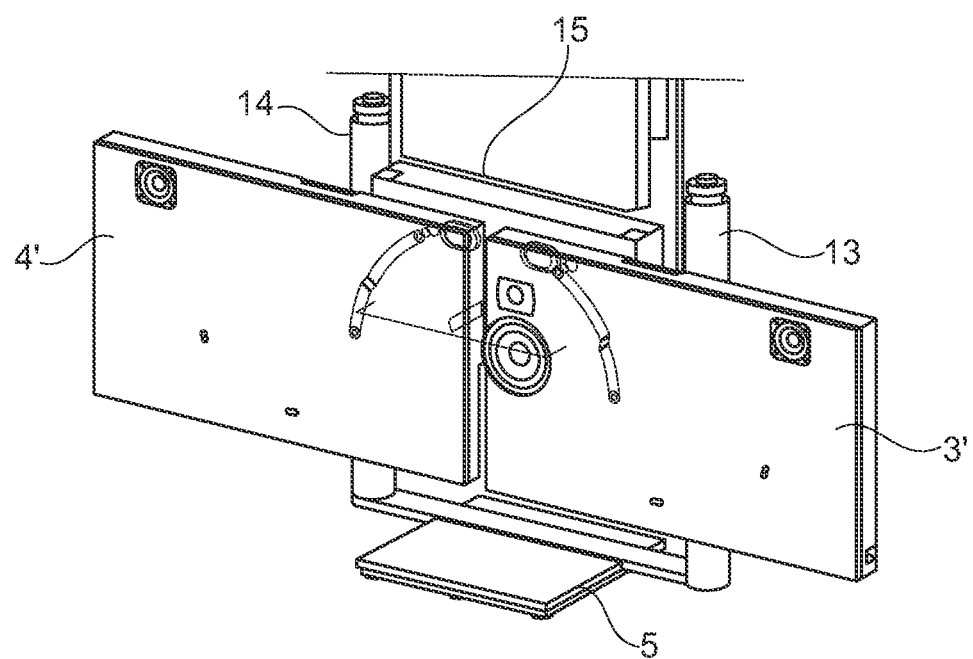
FIG. 7c illustrates the loudspeaker housings in their final, second position, with the side control arms having pulled the loudspeaker housings close together again.

In a further development of the construction the lateral movement of the loudspeaker assemblies is guided by secondary lever arms as will be explained with reference to FIG. 7*a*-7*c*.

The secondary lever arms 25, 26 are in one end connected to the rear side of respective loudspeaker housings 3', 4' and in opposite ends connected to the bridge 15 next to the elongated apertures 17, 18. In this particular embodiment the secondary lever arms 25, 26 are slightly curved, and as a consequence, connection points are offset from the loudspeaker housing rotation points in the elongated apertures 17, 18, and as a consequence, as the movement is initiated in order to bring the loudspeaker assemblies from the first position as illustrated with reference to for example FIG. 6*a*, into the second position as illustrated with reference to FIG. 6*c*, the secondary lever arms will retain a fixed distance between the closest points of the two loudspeaker housings 3', 4' with respect to each other such that they never touch during the rotational movement. The secondary lever arms 25, 26 need not be curved. The object of the secondary lever arms 25, 26 is to connect the connection points 17, 18 by a rigid member to a point on the loudspeaker housing 3', 4'.

Furthermore, by positioning the connection points of the secondary lever arms 25, 26 appropriately, it is possible to maintain the same distance between the loudspeaker housings 3', 4' throughout the transition from the first position to the second position (see FIG. 6*c*) such that a very strict design regime is obtained. The secondary lever arms 25, 26 are necessary in order to guide and control the lateral movement of the connection points in the elongated apertures 17, 18 such that this lateral movement is not random during the movement of the loudspeaker housings 3', 4' from the first to the second position.

In practice the screen 2 as illustrated with reference to FIG. 1-3 is mounted on the movable part 12 of the base 10. This also facilitates that the screen may pass behind the loudspeaker assemblies 3, 4 such that in the first position the loudspeaker assemblies 3, 4 are at least partly covering the surface of the screen 2.

Figure 8A:
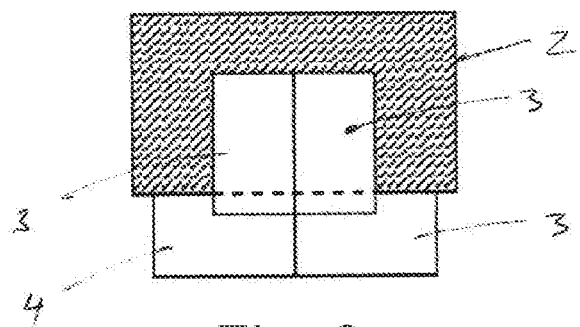
FIG. 8a-8c illustrate various combinations of screens and loudspeaker assemblies.
Figure 8B:
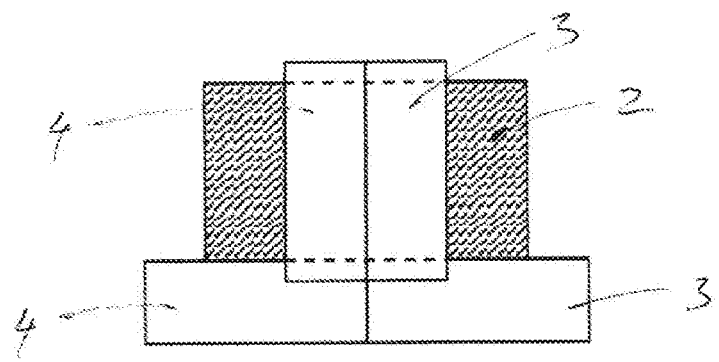
Figure 8C:
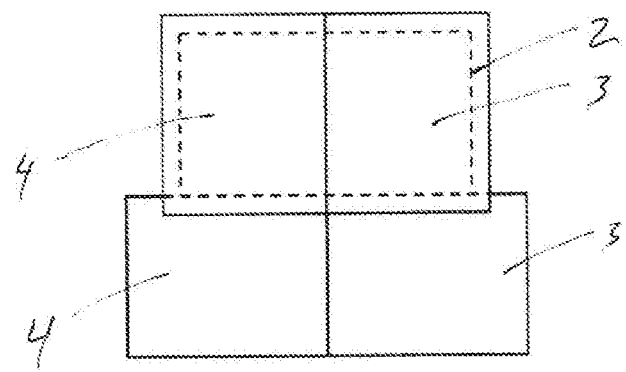

In FIG. 8*a*-8*c* are illustrated various combinations of screens 2 and loudspeaker assemblies 3, 4. The loudspeakers 3, 4 are illustrated both in the first position where the loudspeakers partly or completely cover the screen 2, and in the second position where the loudspeakers are moved away from the screen, exposing the front of the screen. In the illustrated positions the entire surface of the screen is exposed in the second position, but as mentioned above, it is also contemplated that the speakers in the second position may cover a (small) part of the screen.

In FIG. 8a the loudspeakers 3, 4 are substantially smaller than the screen 2, such that the loudspeakers 3, 4 in the first position only cover a relatively small portion of the screen 2, and in the second position have a width smaller than the width of the screen 2.

In FIG. 8b the loudspeakers 3,4 in the first position are not covering the width of the screen 2, and in the second position the width of the loudspeakers 3,4 is larger than the width of the screen 2.

In FIG. 8c the speakers 3, 4 together cover a larger area than the screen 2 (dashed lines) in the first position, thereby fully covering the screen 2. In the second position the loudspeakers 3, 4 have a width wider than the width of the screen 2.

The invention as illustrated may have any combination of screen size relative to the size of the loudspeakers 3, 4.

The invention claimed is:

1. Multimedia installation comprising a base to which base a video screen is mounted and where two movable loudspeaker assemblies are rotatably mounted to said base where the base has a stationary part and a movable part, such that by activating the multimedia installation the screen is elevated by the movable part, and the movable loudspeaker assemblies comprise means for rotating the movable loudspeaker assemblies from a first position where the loudspeaker assemblies cover at least a part of the screen as seen from a user's position, into a second position where at least a substantial and larger part of the screen is visible and if/when desirable back to the first position.

2. Multimedia installation according to claim 1, wherein the base comprises at least one electrically operated actuator suitable to elevate and lower the movable part relative to the stationary part of the base, and thereby the screen.

3. Multimedia installation according to claim 1, wherein the base is provided with two ground towers attached to the stationary part, where each ground tower in a distal end is provided with a pivotal connection to a first end of a lever arm, where said lever arm in the opposite end is pivotally connected to one loudspeaker assembly, and where the same loudspeaker assembly is pivotally connected to a loudspeaker assembly connection point provided on the movable part of the base, such that as the base is activated to elevate or lower the screen, and the movable part moves relative to the stationary part, the loudspeaker assemblies are rotated at the same time.

4. Multimedia installation according to claim 3, wherein the connection points provided on the movable part are longitudinal apertures arranged with their longitudinal extent perpendicular to the direction of movement of the movable part, such that the pivotal connection between the lever arm and the movable part, moves inside said longitudinal aperture.

5. Multimedia installation according to claim 4, wherein a side control arm is provided for each movable loudspeaker assembly, said side control arm is in one end connected adjacent the connection points in the movable part, and in the other end pivotably fastened to the loudspeaker assembly, such that as the loudspeaker assembly rotates, the side control arm ensures that a constant distance remains between adjacent and closest sides of the loudspeaker assemblies.

6. Multimedia installation according to claim 1, wherein the up and down movement of the movable part is controlled by a control unit, and where said rotatable loudspeaker assemblies are connected to respective electrical motors via axles, belts, rack and pinion or chains, where the control unit controls the turning of the axles such that the loudspeaker assemblies are rotated from the first position to the second position substantially during the time lapsed for the screen to reach its desired elevation, and vice versa.

7. Multimedia installation according to claim 1, wherein the loudspeaker assemblies in the first position substantially cover the screen as seen from a direction perpendicular to the display surface of the screen.

8. Multimedia installation according to claim 1, wherein a part of the screen is visible in the first position and where a control unit creates a display of information on the part of the screen not covered by the loudspeaker assemblies.

9. Multimedia installation according to claim 1, wherein the loudspeaker assemblies each comprise a housing and a front cover, where each housing and front cover have a lower side and an upper side, and an inner and outer side connecting distal ends of the upper and lower sides, such that in the first position the inner sides are proximate and substantially parallel to each other, the sides together defining the periphery of each substantial four sided housing and front cover, wherein the front cover is substantially larger than the housing, and where the front covers of both loudspeaker assemblies in the first position are arranged such that the inner sides are parallel and flush with a corresponding side of the housing, and the lower sides are at the same level and flush with lower sides of respective housings.

* * * * *